United States Patent
Chojnacka et al.

(10) Patent No.: US 11,158,128 B2
(45) Date of Patent: Oct. 26, 2021

(54) SPATIAL AND SEMANTIC AUGMENTED REALITY AUTOCOMPLETION IN AN AUGMENTED REALITY ENVIRONMENT

(71) Applicant: GOOGLE LLC, Mountain View, CA (US)

(72) Inventors: Roza Chojnacka, Mountain View, CA (US); Meltem Oktem, Sunnyvale, CA (US); Rajan Patel, Mountain View, CA (US); Uday Idnani, Mountain View, CA (US); Xiyang Luo, Sunnlyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/395,505

(22) Filed: Apr. 26, 2019

(65) Prior Publication Data
US 2020/0342668 A1 Oct. 29, 2020

(51) Int. Cl.
*G06T 19/00* (2011.01)
*G06K 9/62* (2006.01)
*G06T 7/60* (2017.01)
*G06K 9/00* (2006.01)
*G06T 7/73* (2017.01)

(52) U.S. Cl.
CPC ........ *G06T 19/006* (2013.01); *G06K 9/00664* (2013.01); *G06K 9/6201* (2013.01); *G06T 7/60* (2013.01); *G06T 7/73* (2017.01); *G06T 2200/24* (2013.01)

(58) Field of Classification Search
None
See application file for complete search history.

(56) References Cited

U.S. PATENT DOCUMENTS

| | | | |
|---|---|---|---|
| 9,087,403 B2 * | 7/2015 | Keating | A63F 13/00 |
| 9,723,226 B2 | 8/2017 | Newhouse et al. | |
| 9,824,495 B2 | 11/2017 | Hagbi et al. | |
| 10,339,718 B1 * | 7/2019 | Kamal | G06T 19/006 |
| 10,339,721 B1 * | 7/2019 | Dascola | G06T 13/20 |
| 2011/0288912 A1 | 11/2011 | McCrea et al. | |
| 2016/0193732 A1 | 7/2016 | Breazeal et al. | |
| 2019/0121522 A1 * | 4/2019 | Davis | G06F 3/04815 |
| 2019/0197599 A1 * | 6/2019 | Zia | G06Q 30/0643 |
| 2020/0184653 A1 * | 6/2020 | Faulkner | G06F 3/011 |

\* cited by examiner

*Primary Examiner* — Hilina K Demeter
(74) *Attorney, Agent, or Firm* — Brake Hughes Bellermann LLP

(57) ABSTRACT

A system and method may provide for spatial and semantic auto-completion of an augmented or mixed reality environment. The system may detect physical objects in a physical environment based on analysis of image frames captured by an image sensor of a computing device. The system may detect spaces in the physical environment that are occupied by the detected physical objects, and may detect spaces that are unoccupied in the physical environment. Based on the identification of the detected physical objects, the system may gain a semantic understanding of the physical environment, and may determine suggested objects for placement in the physical environment based on the semantic understanding. The system may place virtual representations of the suggested objects in a mixed reality scene of the physical environment for user consideration.

19 Claims, 20 Drawing Sheets

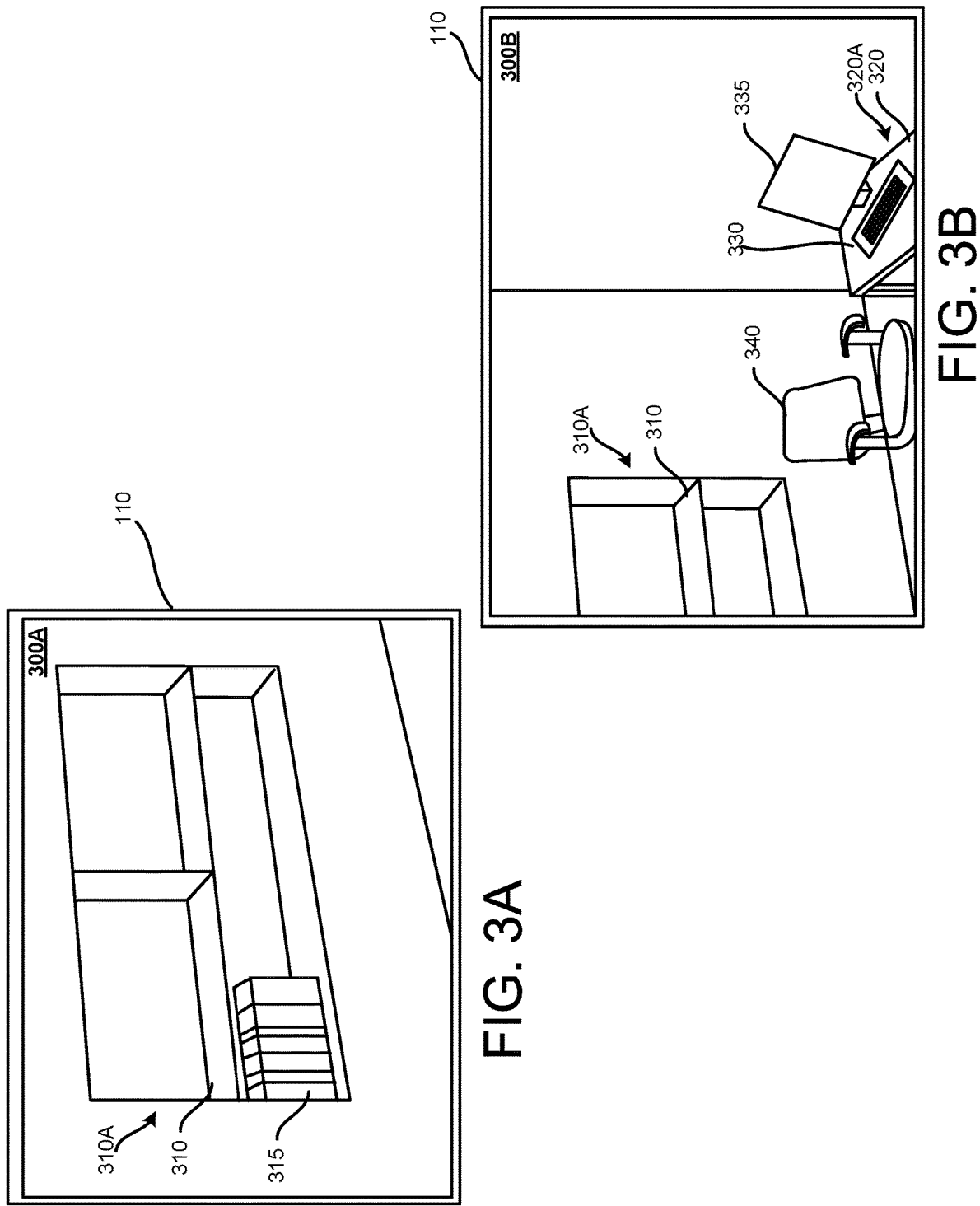

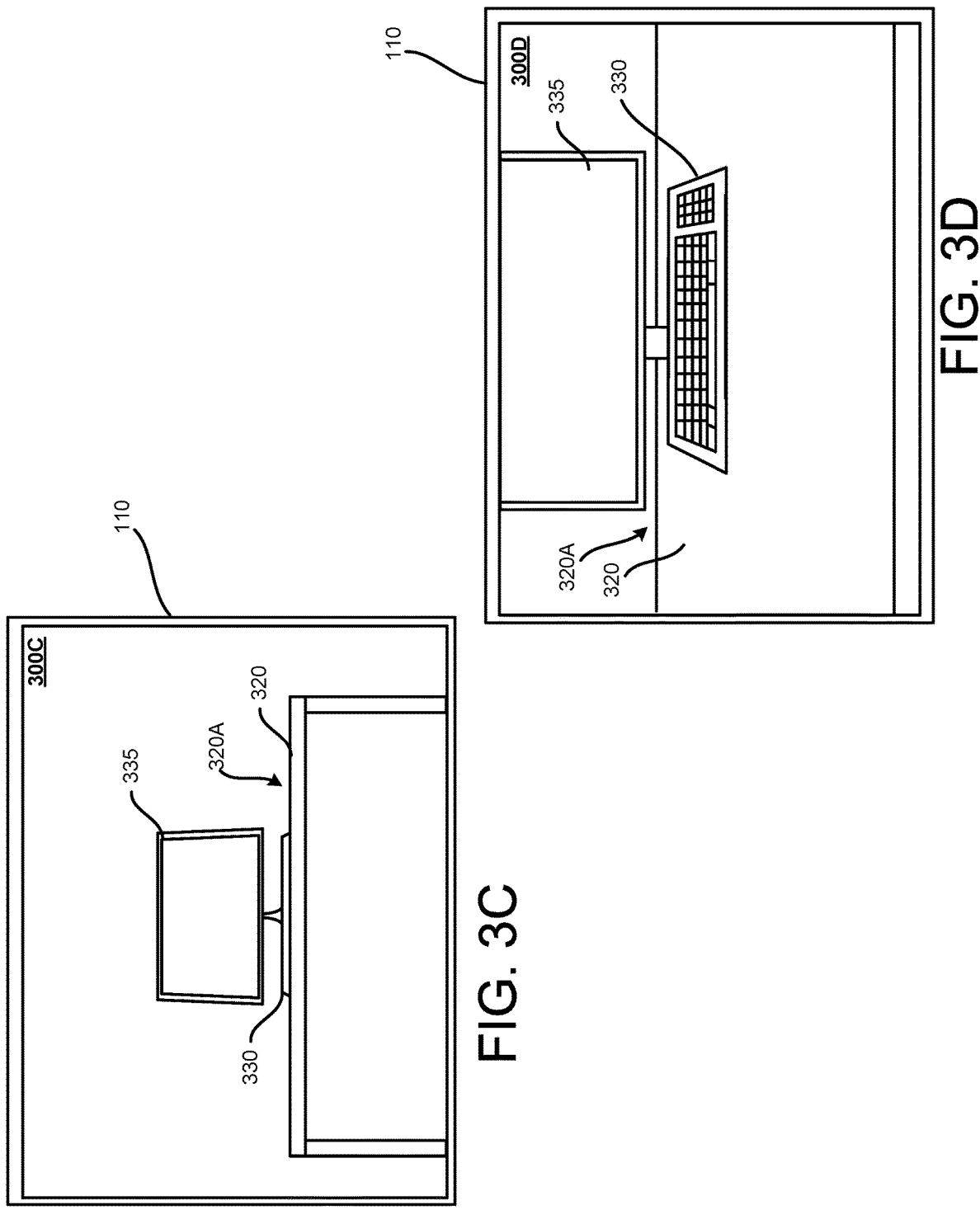

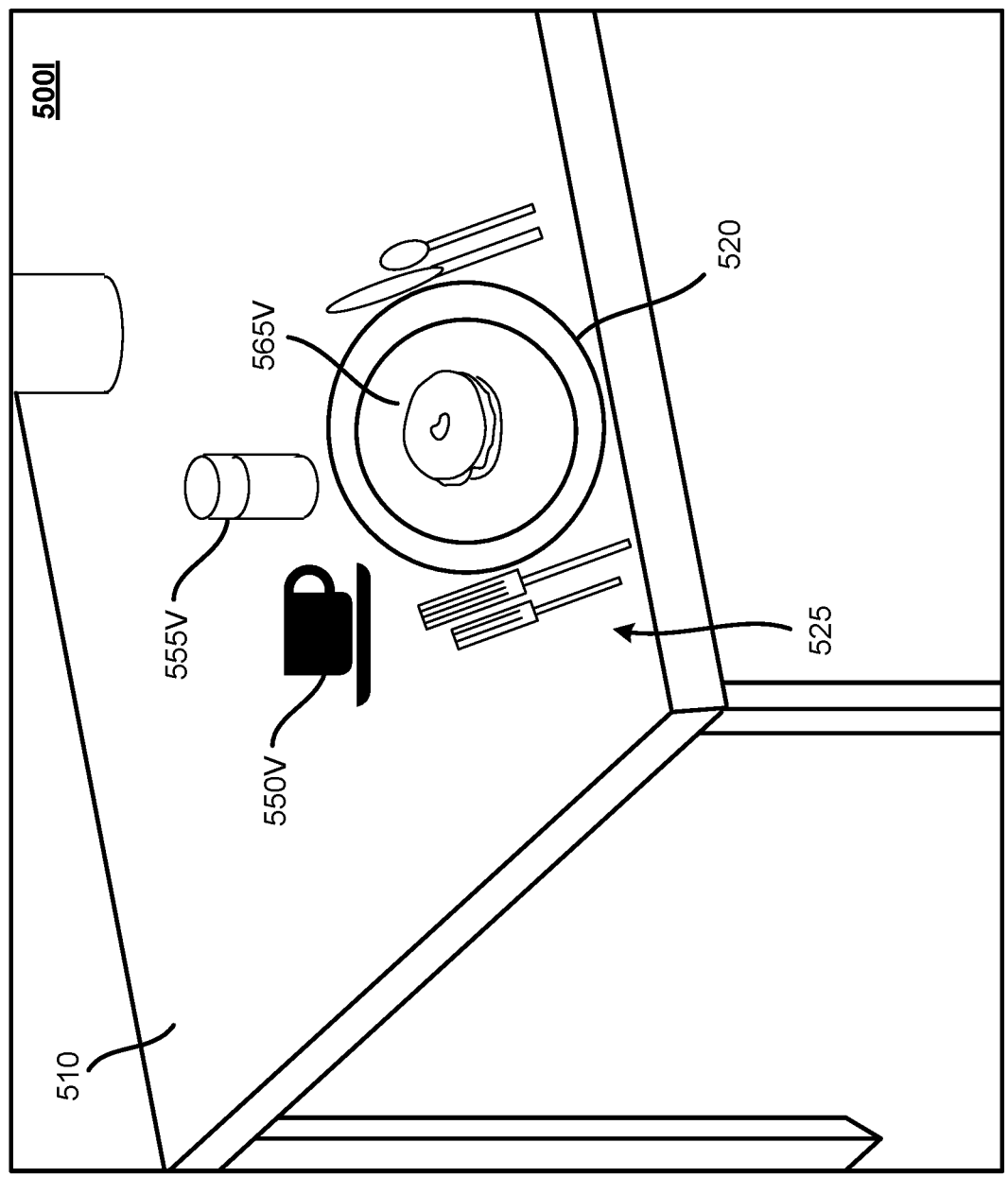

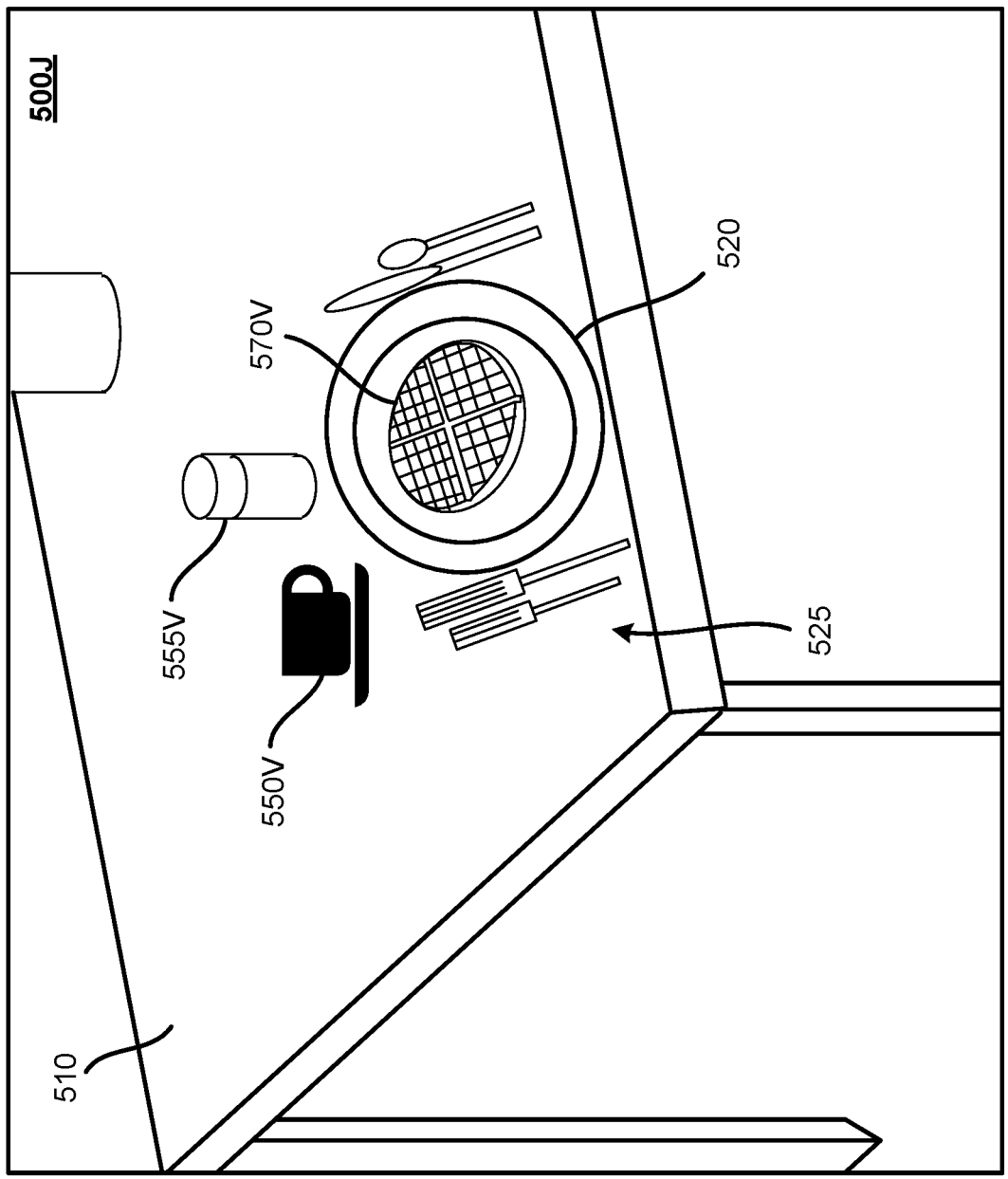

SPATIAL AND SEMANTIC AUGMENTED REALITY AUTOCOMPLETION IN AN AUGMENTED REALITY ENVIRONMENT

TECHNICAL FIELD

This description generally relates to the use of computing devices in an augmented, or mixed, reality environment.

BACKGROUND

Augmented, or mixed reality systems, or virtual reality systems, may allow users to view scenes, for example, scenes corresponding to their physical environment, and to augment the scenes of their physical environment with virtual objects. A user may experience an augmented or mixed reality system and/or a virtual reality system may generate a three-dimensional augmented and/or mixed and/or virtual reality environment through interaction with various electronic devices. This type of augmented reality, or mixed reality, or virtual reality, experience, would be enhanced by germane, pertinent, contextual suggestion and/or placement of virtual object(s) in a scene viewed by the user.

SUMMARY

In one general aspect, a computer-implemented method may include detecting, by a sensor of a computing device, physical objects in a physical environment, identifying the detected physical objects, identifying at least one unoccupied space in the physical environment, analyzing the detected physical objects and the at least one unoccupied space, identifying at least one suggested object for placement in the unoccupied space in the physical environment, and placing at least one virtual representation corresponding to the at least one suggested object in a mixed reality scene of the physical environment generated by the computing device, at a position in the mixed reality scene corresponding to the at least one unoccupied space identified in the physical environment.

In some implementations, detecting the physical objects in the physical environment may include capturing, by an image sensor of the computing device, image frames of the physical environment, detecting the physical objects in the image frames captured by the image sensor, comparing the detected physical objects to images stored in a database accessible to the computing device, and identifying the physical objects based on the comparison. In some implementations, detecting the physical objects may include detecting occupied spaces in the physical environment, including directing a plurality of rays from the computing device toward the physical environment as the image frames of the physical environment are captured, detecting a plurality of keypoints at points where the plurality of rays intersect with the physical objects, marking three-dimensional bounds of the physical objects in response to the detection of the plurality of keypoints, each of the plurality of keypoints being defined by a three-dimensional coordinate, and marking locations on a plane respectively corresponding to the physical objects as occupied spaces based on the marked bounds of each of the physical objects. In some implementations, identifying the at least one unoccupied space may include superimposing a two-dimensional grid on the plane, the two-dimensional grid defining a plurality of tiles, projecting the plurality of keypoints onto the grid, detecting points at which the projected keypoints intersect tiles of the grid, marking the tiles, of the plurality of tiles, at which the keypoints intersect the grid, as occupied spaces, and marking remaining tiles, of the plurality of tiles, as unoccupied spaces.

In some implementations, the computer-implemented method may also include determining a size of each of the unoccupied spaces based on at least one of a size, a contour, or an orientation of an identified physical object occupying one of the marked occupied spaces. Identifying at least one suggested object for placement in the unoccupied space in the physical environment may include determining a context of the physical environment based on the identification of the detected physical objects, and identifying the at least one suggested object based on the determined context of the physical environment and the identified at least one unoccupied space. In some implementations, identifying the at least one suggested object may include identifying the at least one suggested object based on the determined size of the at least one unoccupied space relative to a position and an orientation of the identified physical objects. In some implementations, identifying the at least one suggested object may include identifying the at least one suggested object based on at least one of user preferences, user profile information, user browsing history, or an inventory of available items.

In some implementations, the computer-implemented method may include rearranging the placement of the at least one virtual representation corresponding to the at least one suggested object in the mixed reality scene of the physical environment in response to a user input. In some implementations, the at least one virtual representation corresponding to the at least one suggested object is manipulatable by the user so as to allow the user to select the at least one suggested object, or access additional information related to the at least one suggested object.

In another general aspect, a system may include at least one computing device, including a memory storing executable instructions, and a processor configured to execute the instructions. Execution of the instructions may cause the at least one computing device to detect, by a sensor of the at least one computing device, physical objects in a physical environment, identify the detected physical objects, identify at least one unoccupied space in the physical environment, analyze the detected physical objects and the at least one unoccupied space, identify at least one suggested object for placement in the unoccupied space in the physical environment, and place at least one virtual representation corresponding to the at least one suggested object in a mixed reality scene of the physical environment generated by the computing device, at a position in the mixed reality scene corresponding to the at least one unoccupied space identified in the physical environment.

In some implementations, the instructions may cause the computing device to capture, by an image sensor of the computing device, image frames of the physical environment, detect the physical objects in the image frames captured by the image sensor, compare the detected physical objects to images stored in a database accessible to the computing device, and identify the physical objects based on the comparison. IN some implementations, the instructions may cause the computing device to detect occupied spaces in the physical environment, including direct a plurality of rays from the computing device toward the physical environment as the image frames of the physical environment are captured, detect a plurality of keypoints at points where the plurality of rays intersect with the physical objects, mark three-dimensional bounds of the physical objects in response to the detection of the plurality of keypoints, each of the plurality of keypoints being defined by a three-dimensional coordinate, and mark locations on a plane respectively corresponding to the physical objects as occupied spaces based on the marked bounds of each of the physical objects.

In some implementations, the instructions may cause the computing device to superimpose a two-dimensional grid on the plane, the two-dimensional grid defining a plurality of tiles, project the plurality of keypoints onto the grid, detect points at which the projected keypoints intersect tiles of the grid, mark the tiles, of the plurality of tiles, at which the keypoints intersect the grid, as occupied spaces, and mark remaining tiles, of the plurality of tiles, as unoccupied spaces. In some implementations, the instructions may cause the computing device to determine a size of each of the unoccupied spaces based on at least one of a size, a contour, or an orientation of an identified physical object occupying one of the marked occupied spaces. In some implementations, the instructions may cause the computing device to determine a context of the physical environment based on the identification of the detected physical objects, and identify the at least one suggested object based on the determined context of the physical environment and the identified at least one unoccupied space. In some implementations, the instructions may cause the computing device to identify the at least one suggested object based on the determined size of the at least one unoccupied space relative to a position and an orientation of the identified physical objects. In some implementations, the instructions may cause the computing device to identify the at least one suggested object based on at least one of user preferences, user profile information, user browsing history, or an inventory of available items.

In some implementations, the instructions may cause the computing device to rearrange the placement of the at least one virtual representation corresponding to the at least one suggested object in the mixed reality scene of the physical environment in response to a user input. In some implementations, the at least one virtual representation corresponding to the at least one suggested object is manipulatable by the user so as to allow the user to select the at least one suggested object, or access additional information related to the at least one suggested object. The details of one or more implementations are set forth in the accompanying drawings and the description below. Other features will be apparent from the description and drawings, and from the claims.

BRIEF DESCRIPTION OF THE DRAWINGS

FIGS. 3A-3E illustrate scanning and virtual object placement in an exemplary physical environment shown in FIG. 2A, in accordance with implementations described herein.

FIGS. 5A-5J illustrate scanning and virtual object placement in the exemplary physical environment shown in FIG. 2B, based on detected unoccupied spaces in the exemplary physical environment, in accordance with implementations described herein.

DETAILED DESCRIPTION

Figure 1A:
FIGS. 1A-1C illustrate exemplary systems for generating an augmented, or mixed reality environment.

In general, this document describes example approaches for modeling spatial relations between objects in an ambient, or physical, or real world environment, and for providing automatic suggestion and/or placement of augmented, or mixed reality objects in the real world environment. In an augmented reality (AR) or a mixed reality (MR) system, or a virtual reality (VR) system, in accordance with implementations described herein, the system may analyze what is visible in the real world environment, and provide for placement of three-dimensional (3D) virtual objects, or augmented/mixed reality objects, in a view of the real world environment. For example, in some implementations, the system may analyze a stream of image information, to gain a semantic understanding of 3D pose information and location information related to real objects in the real world environment, as well as object identification information related to the real objects, and other such information associated with real objects in the real world environment. The system may also take into account empty spaces between the identified real objects, to make a determination of empty space(s) in the real world environment that may be available for virtual object placement in the real world environment. With a semantic understanding of the real world environment, suggestions for virtual object(s) to be placed in the real world environment may be pertinent, or germane, or contextual, to the real world environment, thus enhancing the user's experience.

In a system and method, in accordance with implementations described herein, as images are streamed through, for example, a camera of an electronic device, the image frames may be fed through an auto-completion algorithm, or model, to gain a semantic understanding of the physical, real world environment, and in particular, 3D pose and location information of real object(s) in the physical, real world environment. In some implementations, real objects in the physical, real world environment, may be identified through correlation with images in a database, including not just correlation of classes of items, but also correlation of spacing between objects. Empty spacing, for example, spacing available for placement of virtual objects, may be taken into account by transmitting beams through the detected real object(s) in a point cloud, to detect whether or not a space is occupied by a real object. In particular, the detection of unoccupied space may be used to determine spacing available for the selection and suggestion/placement of contextual virtual object(s), based on the semantic understanding of the physical real world environment.

Using this mapped model of the 3D physical, real world space and real world objects, including a semantic understanding and 3D pose and location information of real objects, and available, unoccupied space, the system may recommend items, in particular, germane, pertinent, contextual items, for virtual placement. In some implementations, the suggested items for placement may be ranked by a recommendation model, that may be trained through pairwise scoring between pairs of objects. In some implementations, this can include known/observed user brand interest, location, and other such factors. This suggestion and placement of relevant virtual objects into the physical, real world environment may allow a user to view and identify pertinent items which may be of interest in a particular situation, without the need for extensive searching.

In some implementations, images of the real world environment may be viewed, for example, within a camera view, or scene, on a display portion of an electronic device, with 3D virtual/augmented/mixed reality objects semantically selected and placed in the scene. In some implementations, the real world environment, and virtual object(s) semantically selected and placed in the real world environment may be viewed through a wearable device such as, for example, a head mounted electronic device. As noted above, in some implementations, the 3D virtual/augmented/mixed reality object(s) may be suggested, or selected, and placed, contextually, or semantically with respect to the real world environment based on identification of real objects in the real world environment, and empty, or unoccupied, or available spaces identified in the real world environment.

Figure 1B:
Figure 1C:

FIGS. 1A-1C illustrate various exemplary electronic devices that can generate an augmented or mixed reality, or virtual reality environment through, for example, an application executed by the electronic device. As illustrated in the example shown in FIG. 1A, in some implementations, the user may view and experience an AR/MR environment on a display portion 12 of a handheld device 10. An imaging device 14 of the exemplary handheld device 10 may provide images for display of a camera view, or scene, of the physical, real world environment, together with virtual object(s) selected and placed in the camera view, or scene, of the physical, real world environment based on the semantic understanding of the physical, real world environment. As illustrated in the example shown in FIG. 1B, in some implementations, the user may view and experience an AR/MR environment via a display portion of a wearable device 16. In the example shown in FIG. 1B, the wearable device is a head mounted device 16. In this arrangement, the physical, real world environment may be visible to the user through the head mounted device 16, and suggested virtual object(s) may be placed in, or superimposed on the user's view of the physical, real world environment based on the semantic understanding of the physical, real world environment. As illustrated in the example shown in FIG. 1C, in some implementations, the user may view and experience an AR/MR environment via a display portion of a head mounted device 18 which essentially occludes the user's direct visibility of the physical, real world environment. In this arrangement, a pass through image of the physical environment may displayed on a display portion of the head mounted device 18, with suggested virtual object(s) placed in the camera view, or scene, for example, superimposed on the pass through image, based on the semantic understanding of the physical, real world environment. Each of the handheld device 10 and the head mounted devices 16 and 18 illustrated in FIGS. 1A-1C are electronic devices including display devices capable of displaying virtual objects in an AR, or MR environment. Hereinafter, simply for ease of discussion and illustration, examples of a system providing for placement of suggested virtual objects in an AR/MR environment based on a semantic understanding of a corresponding physical, real world environment, in accordance with implementations described herein, will be presented based on a camera view, or scene, displayed on a display device of an electronic device similar to the exemplary electronic device 10 illustrated in FIG. 1A. However, the principles to be described herein may be applied to other electronic device(s) and/or systems capable of generating and presenting an AR/MR environment in which virtual objects, such as, for example, 3D virtual objects, may be placed based on a semantic understanding of the physical, real world environment.

Figure 2A:
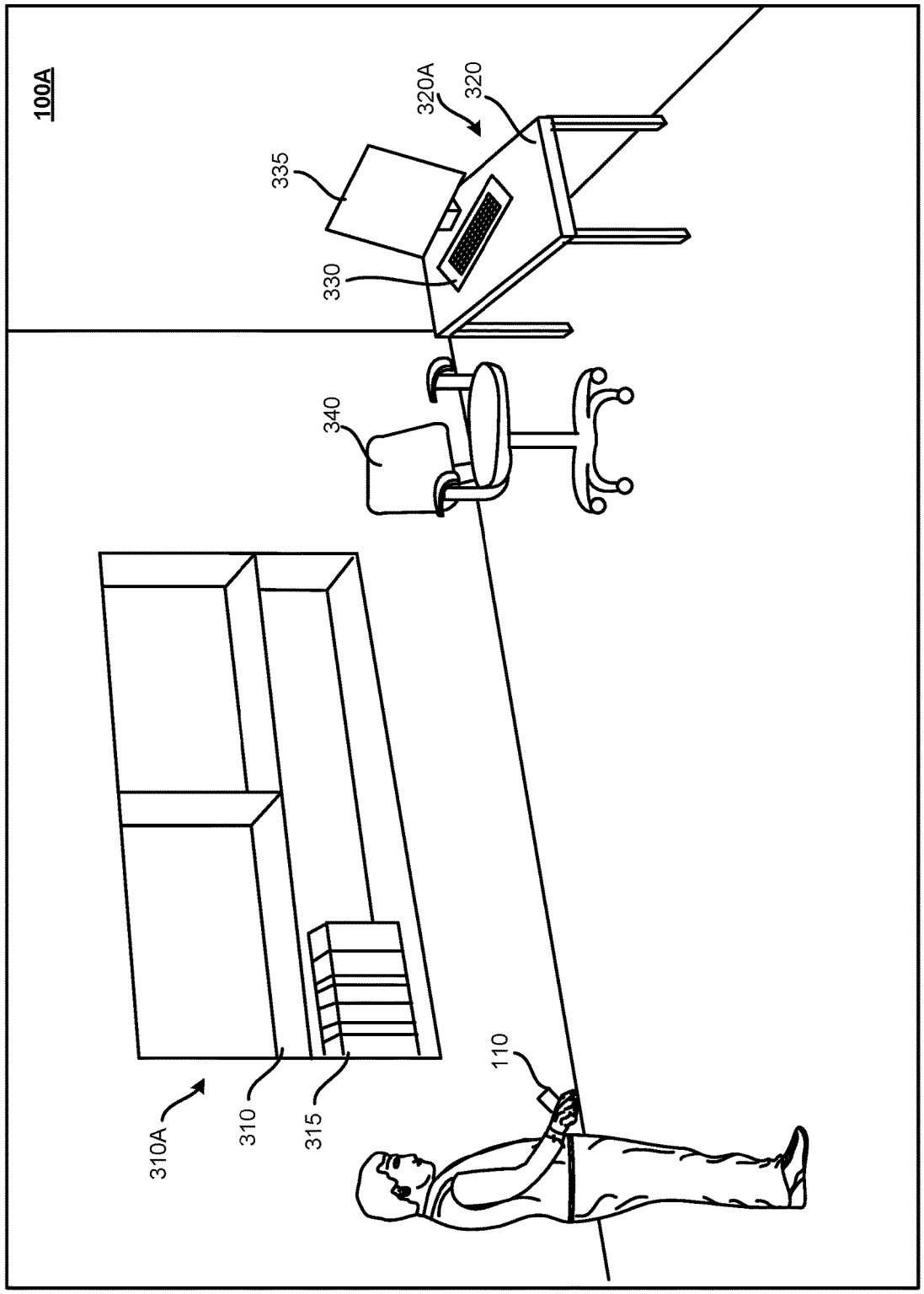
FIGS. 2A-2B illustrate exemplary physical environments, in which a system for generating an augmented, or mixed reality environment may be operated, in accordance with implementations described herein.
Figure 2B:
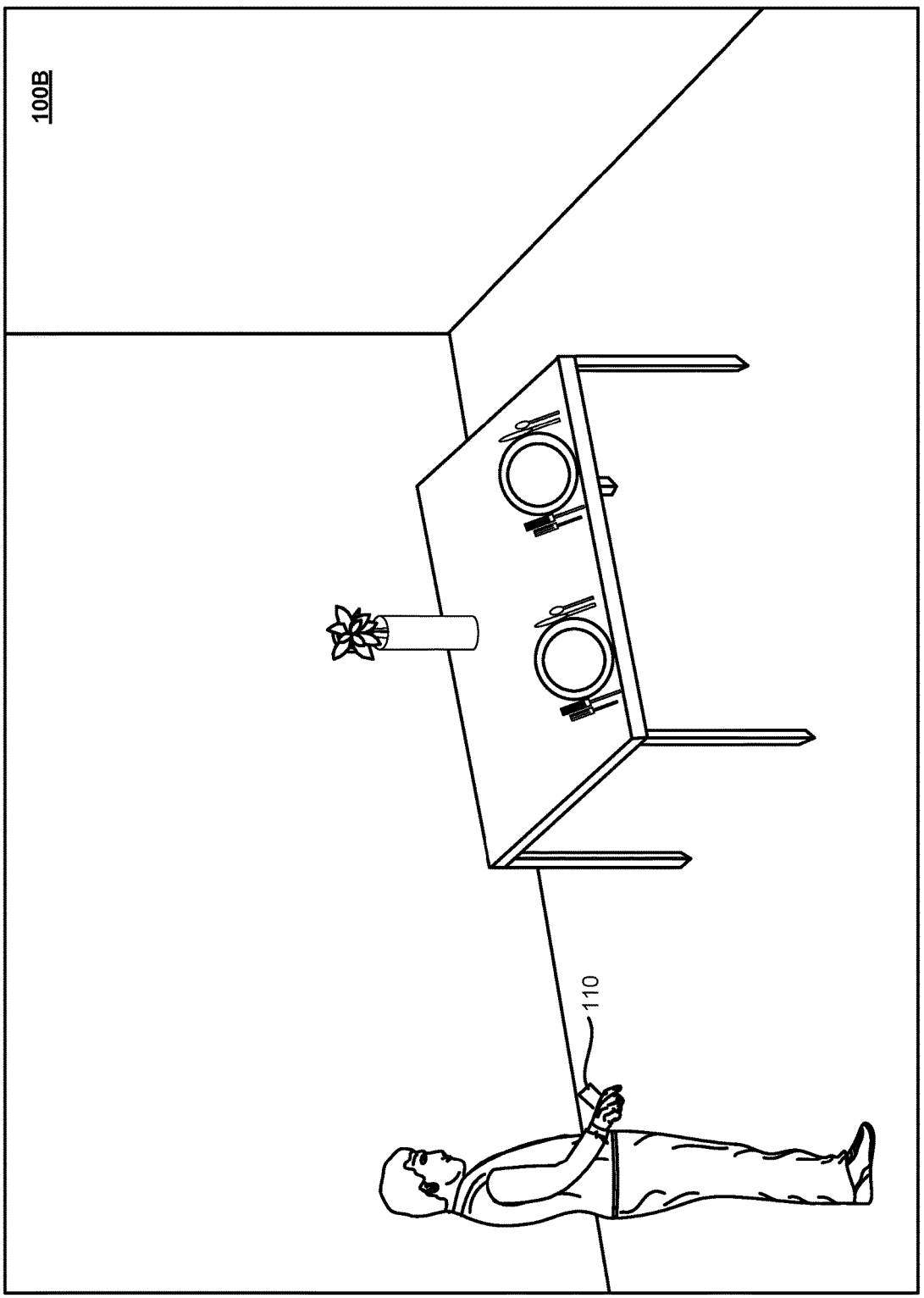

FIGS. 2A, 2B and 2C are third person views of a user in exemplary physical environments 100 (in particular, physical environments 100A, 100B and 100C, respectively), including a variety of different physical objects. In some implementations, the user may experience the AR environment 200 through a camera view, or scene, provided on a display device of an electronic device 110. As noted above, in some implementations, the AR environment 200 may be generated by an AR application running on the electronic device 110. In this example, the AR application may cause the AR environment 200 to be displayed to the user through the camera view, or scene, displayed on the display device of the electronic device 110. As discussed above, in some implementations, the AR environment 200 may be an MR environment including a mixture of virtual objects and physical objects (e.g., virtual objects placed within the scene of the physical environment 100). In this example, the AR environment 200 may be an environment in which virtual objects may be selected and/or placed, by the system and/or by the user, allowing the user to view, interact with, and manipulate the virtual objects displayed within the AR environment 200.

Figure 3E:
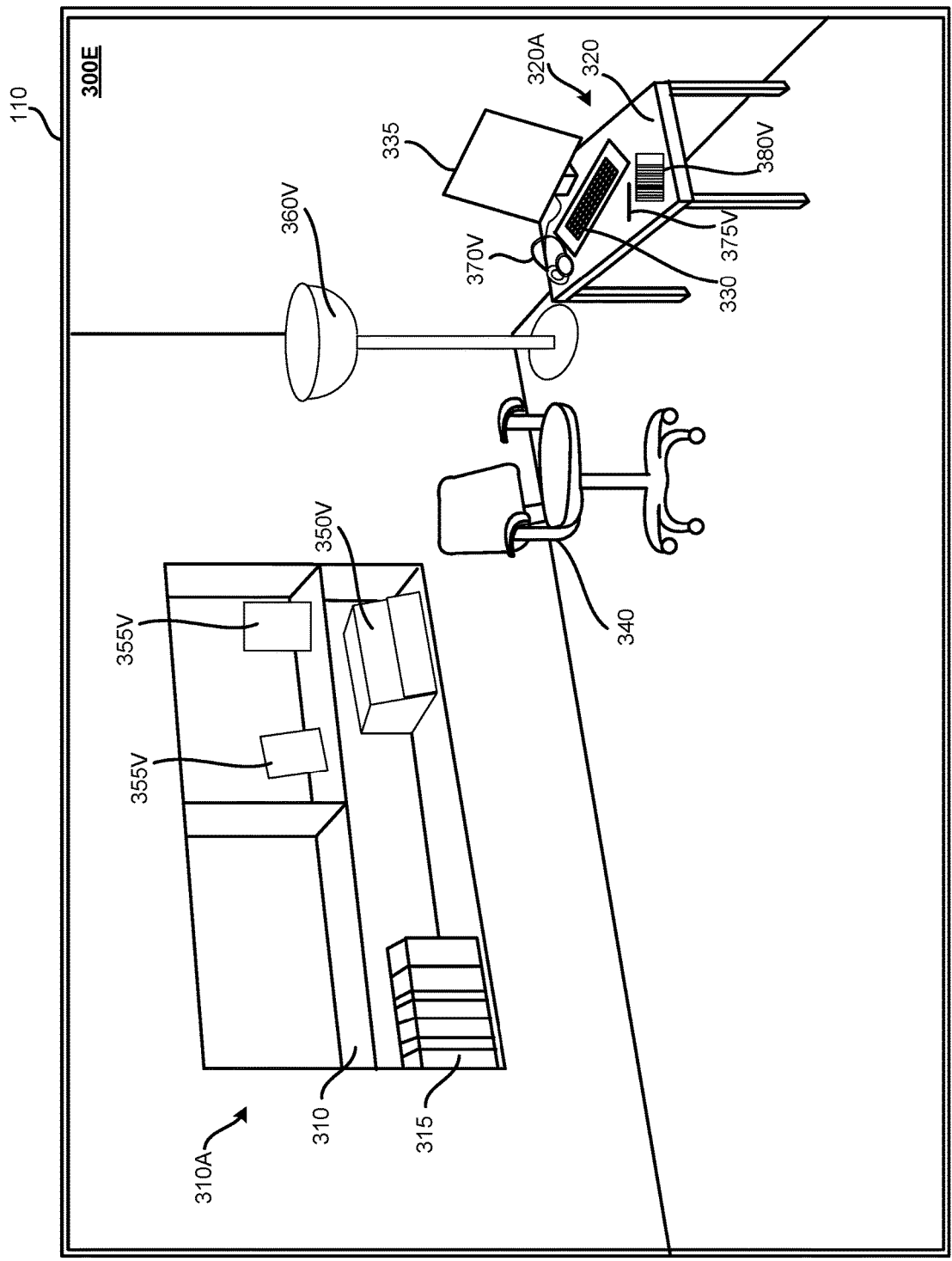

An example in which empty space(s) in the physical, real world environment, for placement of recommended, or suggested, items, based on the detection and identification of real objects in the real world environment, will be explained with respect to FIGS. 3A-3E. As shown in FIG. 3A, a user in the physical environment 100A may use a sensor, for example, a camera of the electronic device 110 to stream images of the physical environment 100A. As the images of the physical environment 100A are streamed, and the image frames are fed into the recognition algorithm or model, 3D pose and location information related to real objects in the physical environment 100A may be detected. Images of the real objects may be correlated against images stored in an image database, to identify the detected real objects. Identification of the real objects in this manner may provide for development of a semantic understanding of the physical, real world environment. The 3D pose and location information related to the detected real objects, and relative arrangement of the real objects, may provide for further semantic understanding of the real world environment. This semantic understanding may be used to place suggested virtual items in a scene of the physical environment, based on detected unoccupied spaces in the physical, real world environment.

FIGS. 3A-3D illustrate sequential camera views 300, or scenes 300, of the physical environment 100A shown in FIG. 2A, as viewed by the user on, for example, a display of the electronic device, as the user moves the electronic device 110 through the physical environment 100A shown in FIG. 2A.

In the example shown in FIGS. 2A and 3A-3D, the user moves the electronic device 110 through the physical environment 100A, in a somewhat left to right, or somewhat clockwise, direction in the example orientation shown in FIGS. 2A and 3A-3D. In this example, FIGS. 3A-3D illustrate sequential camera views, or scenes, 300A, 300B, 300C and 300D of the physical environment 100A as the electronic device 110 is moved in this manner. Each of these exemplary camera views 300A, 300B, 300C and 300D views is a still image, representing a snapshot at a corresponding intermediate location in the physical environment 100A. However, it may be understood that a continuous stream of images, or a dynamic series of images forming such a stream, may be displayed, for example, on a display device of the electronic device 110.

As noted above, images of the physical environment 100A may be streamed in response to execution of an application running on the electronic device 110, and movement of the electronic device 110 and orientation of the camera of the electronic device 110 through the relevant portion of the physical environment 100A. As the corresponding image frames are processed through an algorithm executed by the application, the algorithm may detect a first series of surfaces 310A, for example, a series of adjacent horizontal and vertical surfaces. The algorithm may correlate the detected surface(s) 310A with shelves 310, based on the identification of books 315 positioned relative to the first series of surfaces 310A. Similarly, the system may detect a second surface 320A, for example, a horizontal surface, in the collected image frames, and correlate the detected second surface 320A with a desk 320, based on the identification of a keyboard 330 and a monitor 335 positioned on the second surface 320A, and a desk chair 340 positioned adjacent the surface 320A. In some implementations, physical items in the physical environment 100A such as, for example, the books 315, the keyboard 300, the monitor 335 and the chair 340, may be identified or recognized based on comparison and/or matching with images of previously identified items in a database accessible to the application. Based on the identification and/or recognition of these physical items, the system may identify surrounding items, context and/or functionality associated with the physical environment and the like. For example, the first series of horizontal and/or vertical surfaces may be identified as shelving based on the identification and/or recognition of the books 315 positioned thereon. Similarly, the second surface may be identified as a work surface, or desk (rather than, for example, a table) based on the identification and/or recognition of the keyboard 330 and the monitor 335 positioned thereon.

As described above, in response to detection and identification/recognition of items in the physical environment 100A, which indicate the physical space 100A may be a work space or office space, the system may identify empty, or unoccupied spaces in the physical space 100A. The system may also provide suggestions or recommendations of items which may occupy the currently unoccupied physical spaces in the physical environment 100A, for consideration by the user. These suggestions or recommendations may be provided to the user, in the form of, for example, virtual items positioned in the camera view 300, or scene 300, of the physical environment 100A. This may allow the user to view the suggested items in the physical environment 100A, for consideration with regard to placement, purchase and the like.

FIG. 3E illustrates an exemplary camera view 300E, or scene 300E, of the physical environment 100A, after the image frames have been analyzed and the physical environment 100A and physical objects therein, and unoccupied spaces in the physical environment 100A, have been identified. The exemplary camera view 300E shown in FIG. 3E includes contextually appropriate, suggested items, represented by virtual objects, placed in the camera view 300E of the physical environment 100A, based on the semantic understanding of the physical environment 100A gained from the collection and processing of the image frames as described above with respect to FIGS. 3A-3D. In the exemplary camera view 300E shown in FIG. 3E, a virtual object representing a printer 350V, and virtual objects representing photo frames 355V, have been virtually placed on the shelves 310, based on the semantic understanding of the physical environment 100A and the detected unoccupied space on the shelves 310. Similarly, a virtual object representing a lamp 360V has been placed in the camera view 300E of the physical environment 100A, based on the semantic understanding of the physical environment 100A and the detected unoccupied floor space. Virtual objects representing headphones 370V, a pen 375V, and a pad of paper 380V have been placed on the desk 320, based on the semantic understanding of the physical environment 100A and the detected unoccupied space on the desk 320.

In some implementations, the user may interact with one or more of the virtual objects representing suggested items (such as, for example, the virtual items representing the printer 350V, the frames 355V, the lamp 360V, the headphones 370V, the pen 375V and the paper 380V shown in FIG. 3E). User interaction with the virtual objects representing the suggested items may, for example, provide access to additional information about related to the item, direct the user to purchasing information related to the item, direct the user to other, similar items which may also be suitable in the physical environment, allow the user to move the item to a different portion of the camera view of the physical environment, allow the user to remove the item from the camera view of the physical environment, allow the user to add more of the same and/or similar items to the camera view of the physical environment, and other such actions.

Figure 4:
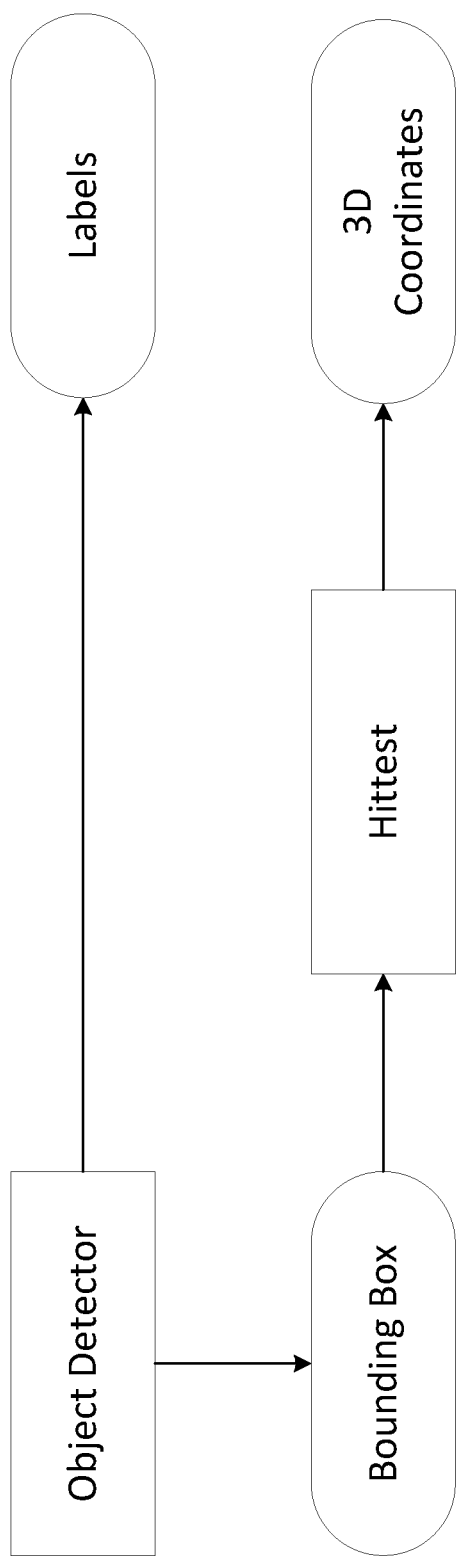
FIG. 4 is a schematic diagram of an object detection, identification and localization system, in accordance with implementations described herein.

In some implementations, the suggestion and placement of virtual objects in the camera view, or scene, of the physical environment, may include determination of semantic labels for physical objects detected in the physical environment, and determination of 3D spatial coordinates of the detected physical items, as shown in FIG. 4. This information may be used develop recommendations for, and auto-placement of, relevant, suggested items semantically placed in the camera view, or scene, of the physical environment. In some implementations, the object detector may be an image based object detector. Images captured by the object detector may be compared may be compared to, and matched with, images stored in an image database, for recognition/identification of the physical objects. In some implementations, hit testing, or hittests, may be performed along a camera direction of the electronic device to localize a detected physical object, and determine 3D coordinates of the detected physical object. For example, in some implementations, hittests may be performed along the camera direction, from a center of a two dimensional bounding box bounding the detected object. In an example in which an object is positioned on a substantially flat, substantially horizontal surface, the hittest result may be further projected to the nearest plane that is lower in height that the previous result, to localize the detected physical object.

As noted, one or more recommended items may be considered for addition to the camera view, or scene, based on the detection of the physical objects and the semantic understanding of the physical environment as described above, with placement of the 3D virtual objects (representative of the recommended items) in detected empty, or unoccupied spaces in the physical environment. In some implementations, placement of the 3D virtual objects in an appropriate location in the camera view, or scene, in terms of the physical (x, y, z) coordinates may be accomplished as shown in FIGS. 5A through 5D.

Simply for ease of discussion and illustration, the detection of empty, or unoccupied, spaces will be described with respect to planar surfaces that are proximate detected physical items, as shown in FIGS. 5A-5D. However, the principles to be described herein may apply to other, non-planar, non-horizontal surfaces in a similar manner.

Figure 5A:
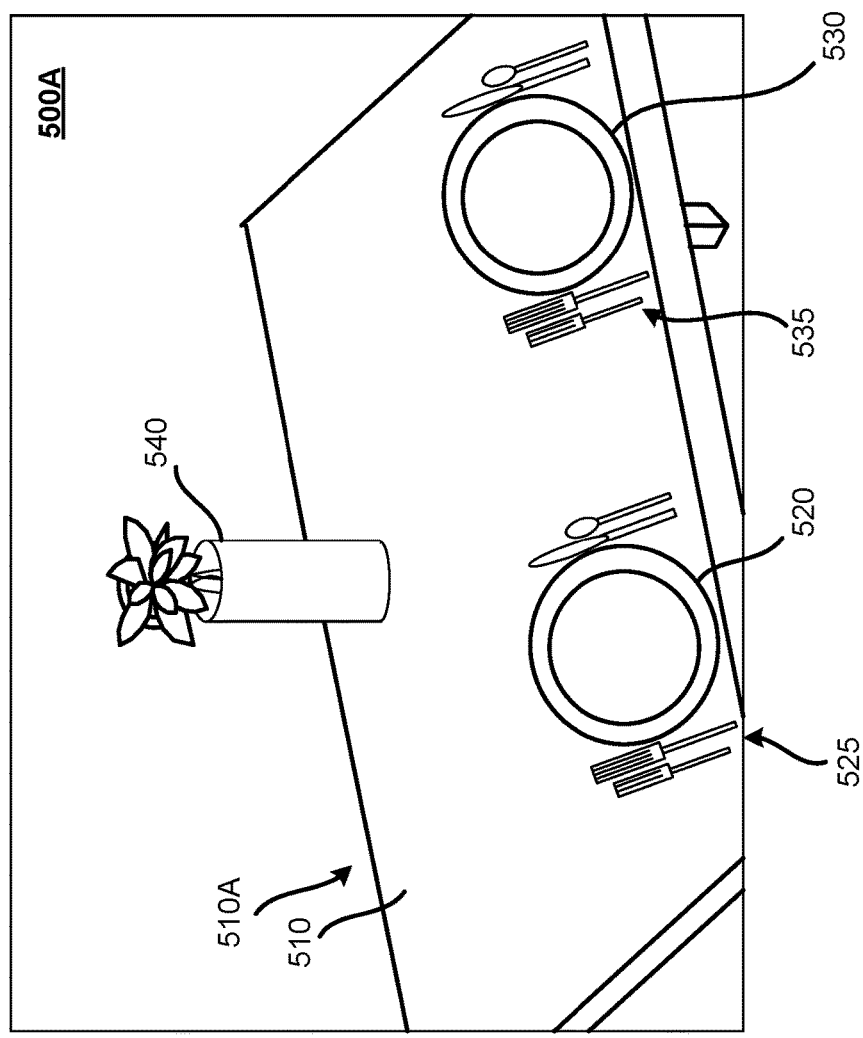

As shown in FIG. 5A, a user in the physical environment 100B (shown in FIG. 2B) may use a sensor, for example, a camera of the electronic device 110 to stream images of the physical environment 100B. FIG. 5A illustrates an image frame 500A in which a plurality of physical objects may be detected, and identified as a first plate 520 and a first set of utensils 525, a second plate 530 and a second set of utensils 535, and a floral arrangement 540. Based on the identification of the first and second plates 520, 530, the first and second sets of utensils 525, 535, and the floral arrangement 540, the system may determine that a detected horizontal surface 510A corresponds to a table 510 (rather than, for example, a desk 310, as in FIGS. 3A-3D), based on the semantic understanding of the physical environment gained by the identification of the plates 520, 530, the utensils 525, 535 and the floral arrangement 540.

Figure 5B:
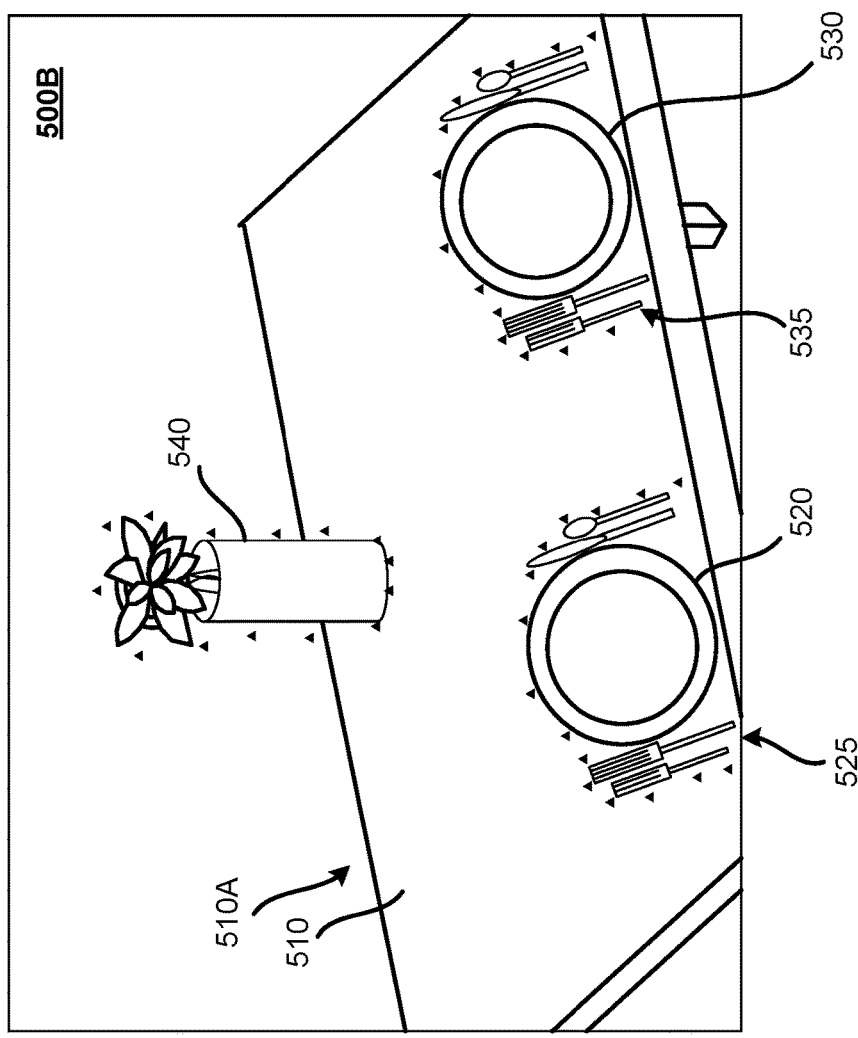

In some implementations, in determining the location and size of empty, or unoccupied spaces, the system may utilize feature points to mark regions that are occupied. For example, as shown in FIG. 5B, the system may apply 3D keypoints (illustrated by the triangles in FIG. 5B) to camera view 500A shown in FIG. 5A (illustrated as an image frame 500B in FIG. 5B) to mark the bounds of identified physical objects, in three dimensions, to in turn mark regions (in three dimensions) that are occupied by physical objects. In some implementations, rays generated by the electronic device 110 may be directed into the physical environment 100B, and keypoints may be detected at each location where the rays intersect a physical object. Each keypoint may be defined by a 3D coordinate, marking a location on a corresponding plane that is occupied. The marked location may be a projection of the keypoint onto the corresponding plane.

Figure 5C:
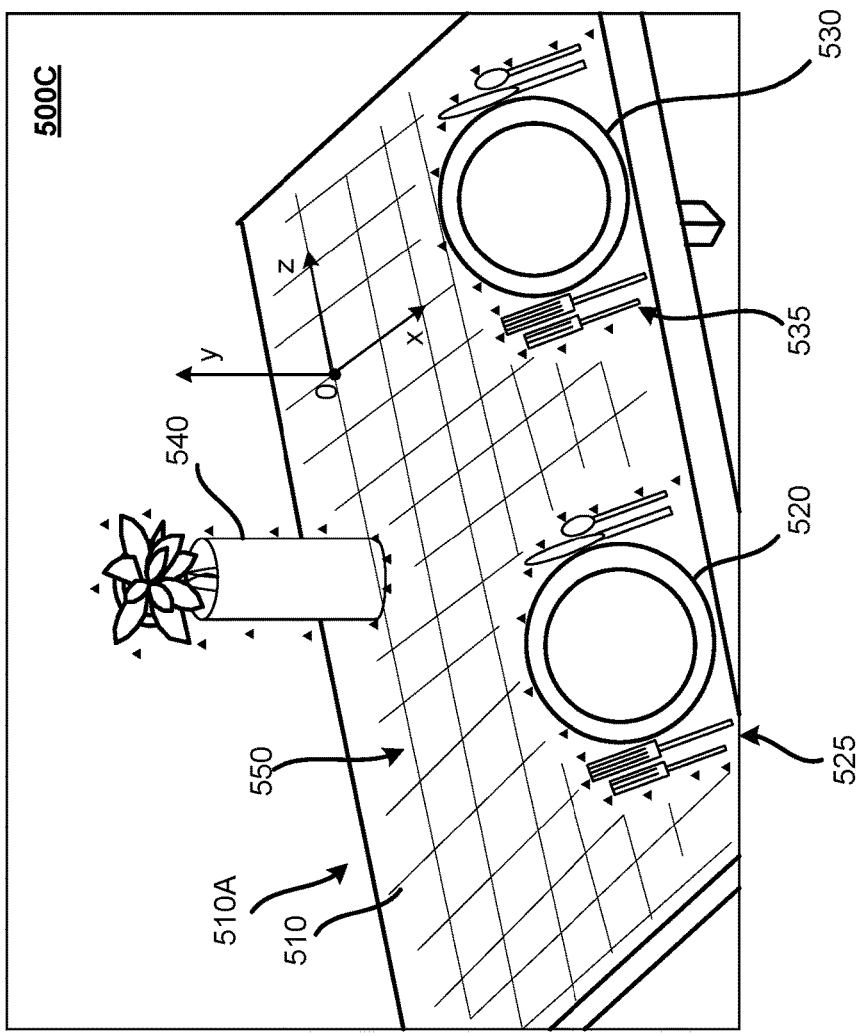

As shown in FIG. 5C, in some implementations, a two-dimensional (2D) grid 550 of tiles may be overlaid on the plane discussed above with respect to FIG. 5B (illustrated as an image frame 500C in FIG. 5C), to simplify the identification of unoccupied and occupied regions or spaces. In this arrangement, the system may track occupied and unoccupied tiles, marking tiles having contained projections of taller feature points as occupied. For example, if the feature point is higher than the plane (in the example orientation illustrated in FIG. 5C), the tile on which the point is projected would be marked as occupied. A point of reference at the origin O may be defined, and a reference anchor may be set, based on the pose of the central portion of the planar surface at detection. The grid 550 may be extended in both the positive and the negative directions of the x axis and the y axis. Given the projection of a feature point (x, y, z) on the plane, a 2D plane coordinate may be defined relative to the reference anchor. Mapping may be achieved by applying the inverse pose of the reference anchor to the feature point, and discarding the y component, as shown in Equation 1 and Equation 2 below.

$$Coord2d.x = anchor.getPose(\ ).inverse(\ ).transform(Coord3d) \quad \text{Equation 1}$$

$$Coord2d.y = anchor.getPose(\ ).inverse(\ ).transform(Coord3d) \quad \text{Equation 2}$$

In some implementations, the grid 550 may be a 2D Boolean array corresponding to the state of each of the tiles. The tiles may be indexed by a pair of integers (for example, row and column), with the plane origin O at substantially the center of the grid 550. Conversion from a point (x, y) to its corresponding tile may be calculated using Equation 3 and Equation 4 below.

$$row = int(Math.round(x/tileSize) + (numRows-1)/2) \quad \text{Equation 3}$$

$$col = int(Math.round(y/tileSize) + (numCols-1)/2) \quad \text{Equation 4}$$

Figure 5D:
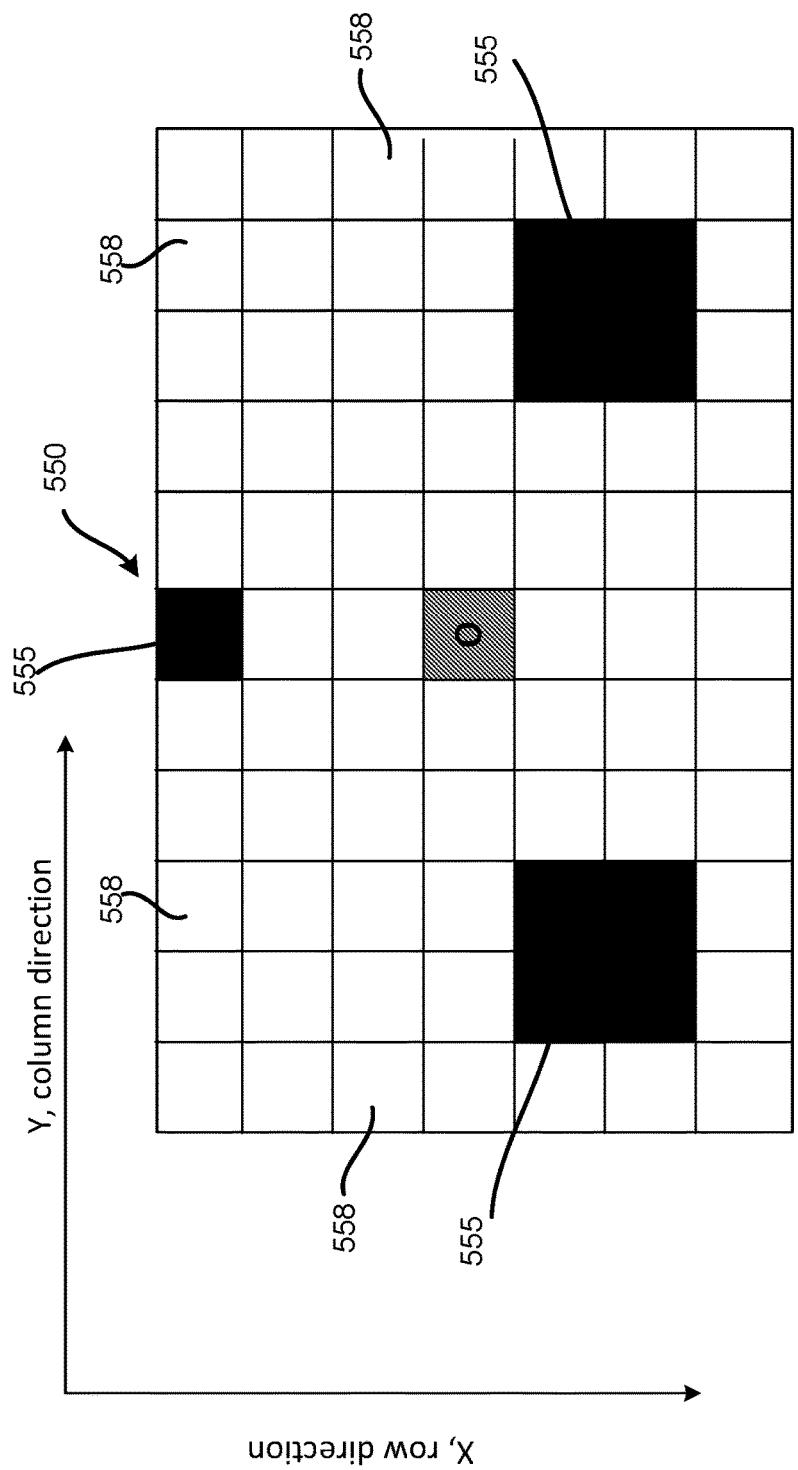

As shown in FIG. 5D, in this manner, occupied tiles 555, or occupied space 555 (illustrated in black), may be distinguished from unoccupied tiles 558, or unoccupied space 558 (illustrated in white), relative to the center, or origin O. A location search for a recommended object may be performed on the 2D grid 550 having occupied spaces or tiles 555 identified. The search may be terminated (and a virtual representation of the recommended or suggested object placed) when an available region of a requisite size is found to be available, and unoccupied in the search location. In some implementations, the search region may be sized to account for the anticipated dimensions of the suggested object. Once a virtual object representing the suggested item is placed, area(s) occupied by the virtual object may also be marked as occupied space 558, or occupied tiles 558.

Referring back to the camera view 500B, or scene 500B, shown in FIG. 5A (illustrating a portion, or scene, of the physical environment 100B shown in FIG. 2B), a semantic understanding of the physical environment 100B may be gained through the identification of physical objects in the physical environment (i.e., the first and second plates 510, 530, the first and second sets of utensils 525, 535, and the floral arrangement 540, all positioned on the table 510). As noted above, the system may recognize and/or identify these physical objects, and apply labels to these physical objects, based on image recognition and comparison with an extensive collection of labeled, annotated images stored in a database that is accessible to the application running on the electronic device 110. In some implementations, findings may be scored, or ranked, to reflect a degree of correlation between a detected physical object and a possible identified match from the database. In some implementations, similar scoring, or ranking, may be taken into consideration when determining connections, or relationships between objects, based on the semantic understanding of the physical environment, and selecting suggested objects to add to the camera view of the physical environment.

Figure 5E:
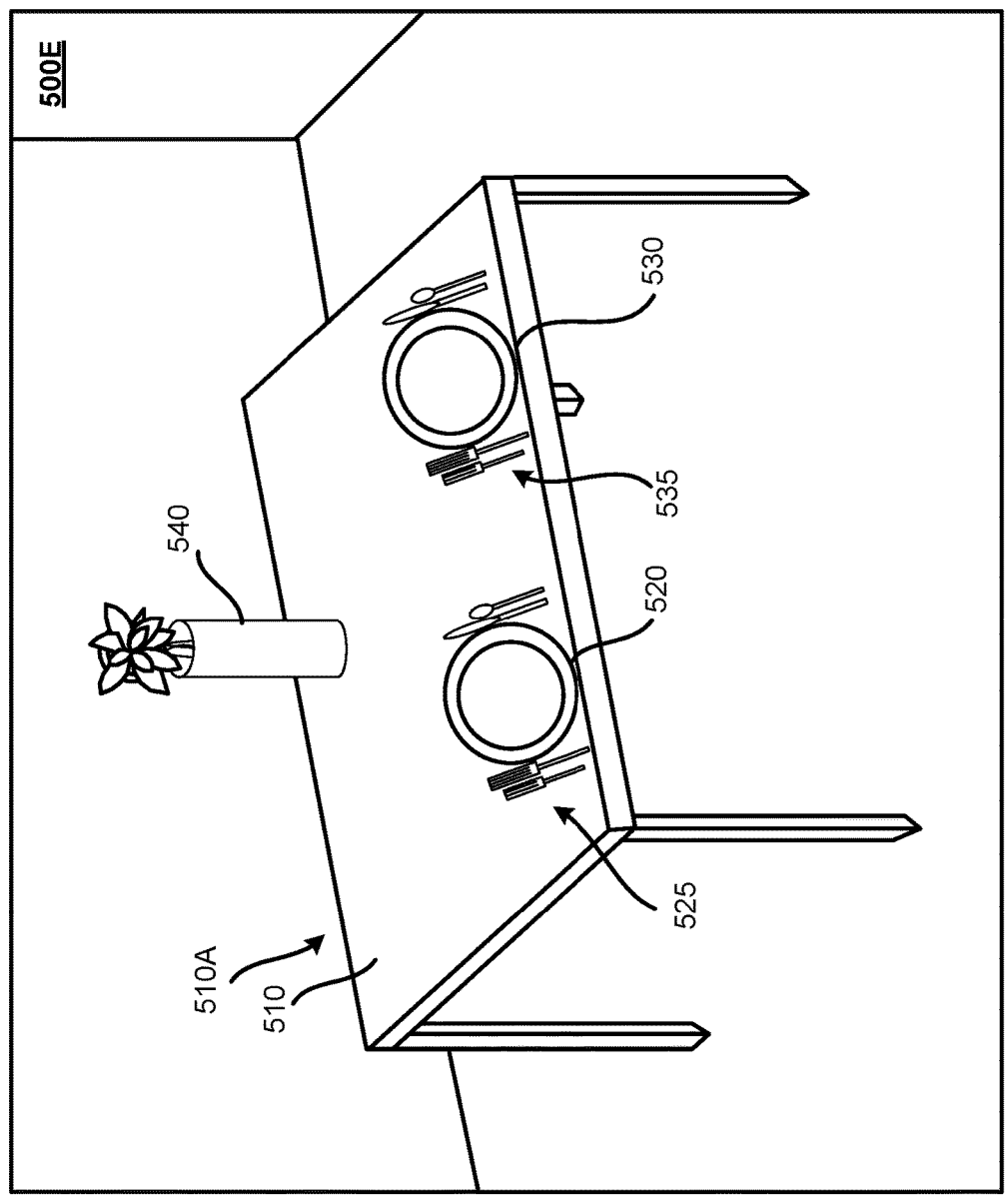
Figure 5F:
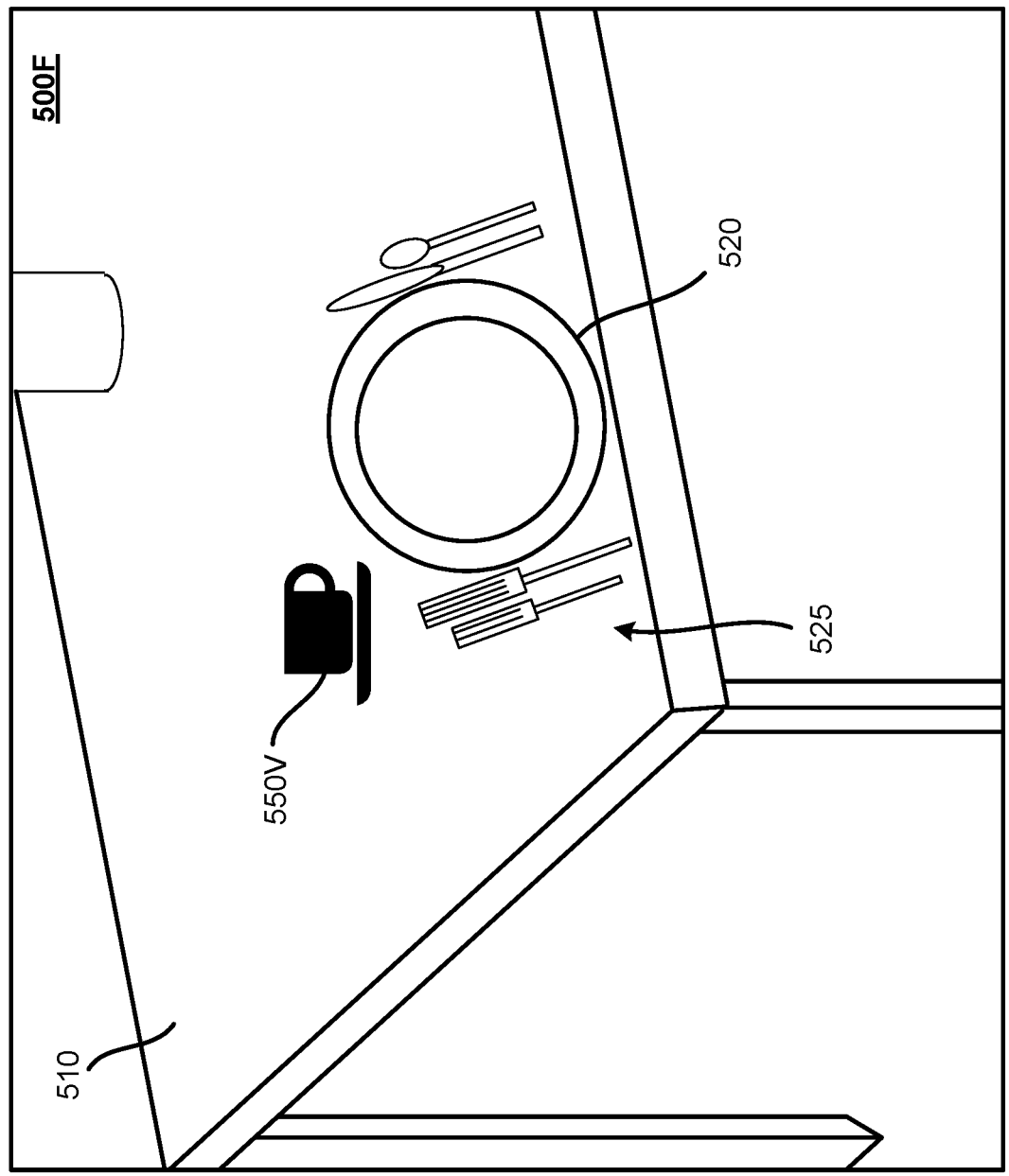
Figure 5G:
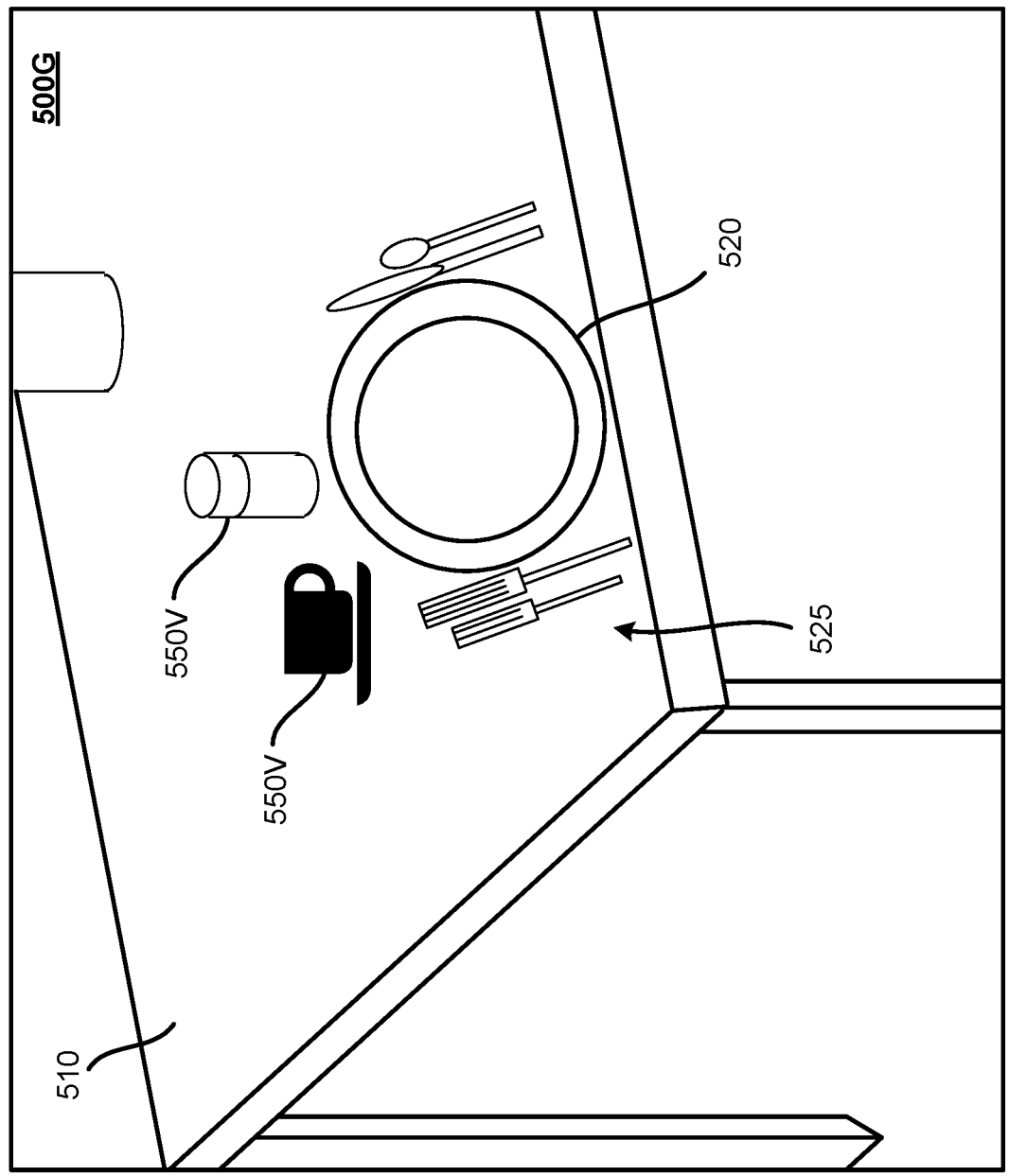
Figure 5H:
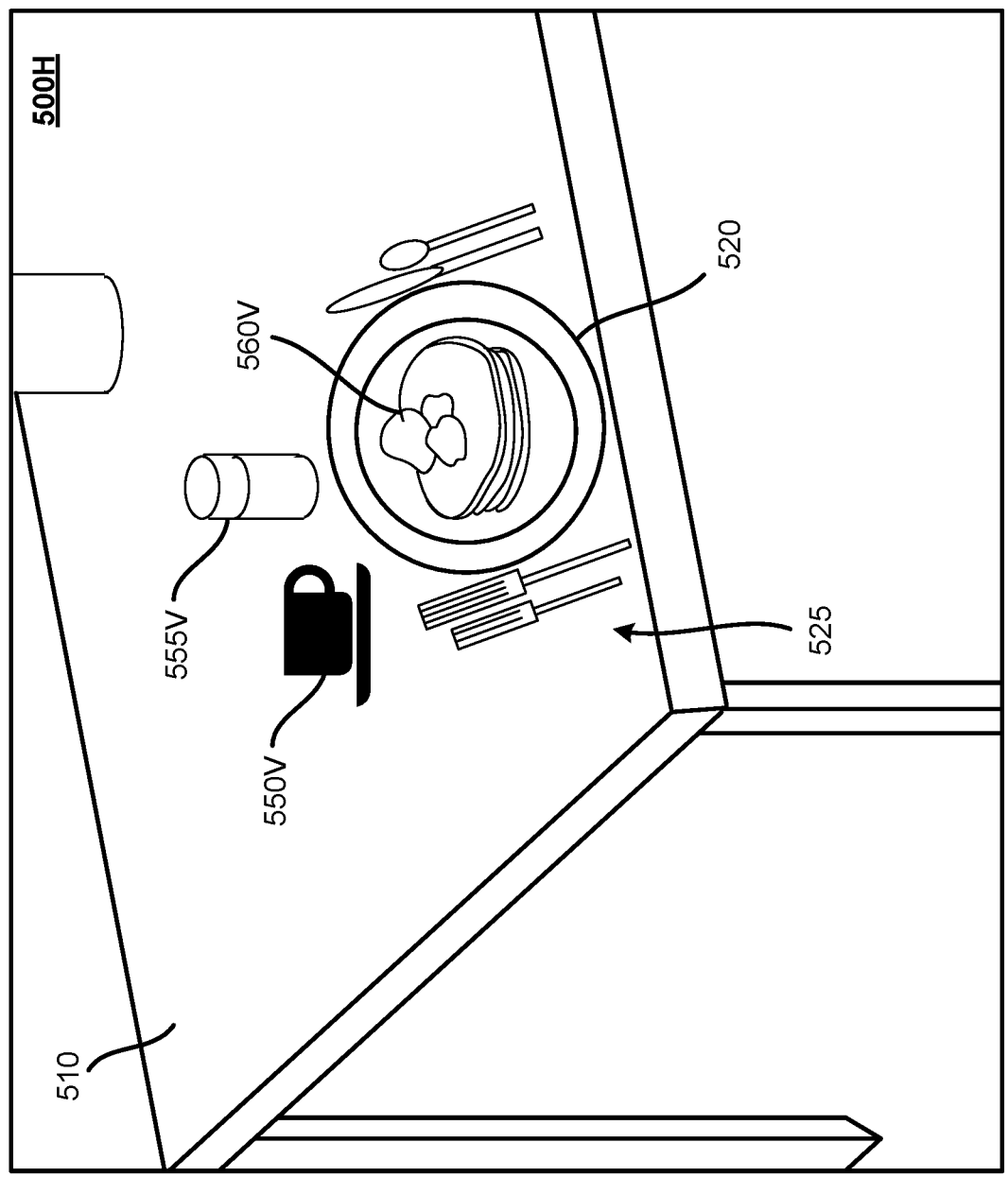

As described above in detail, images of the physical environment 100B may be streamed, and the image frames may be fed into the recognition algorithm or model, to obtain 3D pose and location information, and identification/recognition of real objects in the physical environment 100B to provide for semantic understanding of the physical environment 100B. For example, based on information collected in this manner, the system may determine that the physical environment 100B is a dining room, or a kitchen, or in particular, a dining room table, or a kitchen table as shown in the camera view 500E, or scene 500E, of the physical environment illustrated in FIG. 5E. In some implementations, in which geographic location information is available, the system may determine that the physical environment 100B is a restaurant, or a restaurant table, as shown in the camera view 500E, or scene 500E, of the physical environment illustrated in FIG. 5E.

As shown in FIGS. 5F-5L, based on the semantic understanding of physical environment 100B, the system may place virtual objects, representing suggested items, in the camera view, or scene, of the physical environment 100B, for consideration by the user. In the example shown in FIG. 5F, a virtual object representing a cup of coffee 550V has been placed in the camera view 500F of the physical environment 100B, based on the semantic understanding of the physical environment 100B and the detected unoccupied space on the physical table 510. Similarly, a virtual object representing a beverage glass 555V has been placed in the camera view 500G of the physical environment 100B shown in FIG. 5G. A virtual object representing a first entree 560V has been placed in the camera view 500H of the physical environment 100B shown in FIG. 5H. In this example, the first entree 560V has been placed in a space on the table 510 which was determined to be occupied by the first plate 520. However, based on the semantic understanding of the physical environment 100B, and the real objects occupying the physical environment 100B, the system may determine that the surface defined by the plate 520 is capable of receiving suggested items, and in particular, food items. FIGS. 5I and 5J illustrate camera views 500I and 500J, respectively, of the physical environment 100B, in which different virtual objects, representing different entrees 565V and 570V, are presented for consideration by the user.

In some implementations, the system may take into account other factors such as, for example, geographic location, time of day, user preferences and the like, in determining appropriate virtual objects for placement in the scene of the virtual environment. For example, in placing virtual objects representing the cup of coffee 550V, the beverage glass 555V and the pancakes 560V in the camera view 500H (and/or the bagel 565V and the waffle 570V in the camera views 500I and 500J, respectively), the system may take into consideration the time of day, indicating it is time for breakfast.

In some implementations, the system may take into account what may be available at a particular location. For example, if it is determined that the physical environment 100B is in the home of the user, the system may provide recommendations based on what is available for breakfast selections in the home of the user (based on, for example, access to shopping lists, stored inventories, user preferences and habits, and the like). In another example, if, based on geographic location information, it is determined that the physical environment is a restaurant, then suggestions/recommendations may be presented to the user for consideration based on items that are available on a menu, as well as user preferences and the like.

In some implementations, the user may interact with the virtual objects representing the cup of coffee 550V, the beverage glass 555V, one of the entrees 560V, 565V, 570V and the like to, for example, select the corresponding item. In interacting with a particular virtual object to select the corresponding suggested item, the user may, for example, access additional information related to the item, order the item, move or in some manner change the item, and the like. In some implementations, the user may interact with a virtual object to discard the corresponding item. In some implementations, the system may place virtual objects corresponding to alternative items for consideration by the user, in response to discarded items.

Figure 6:
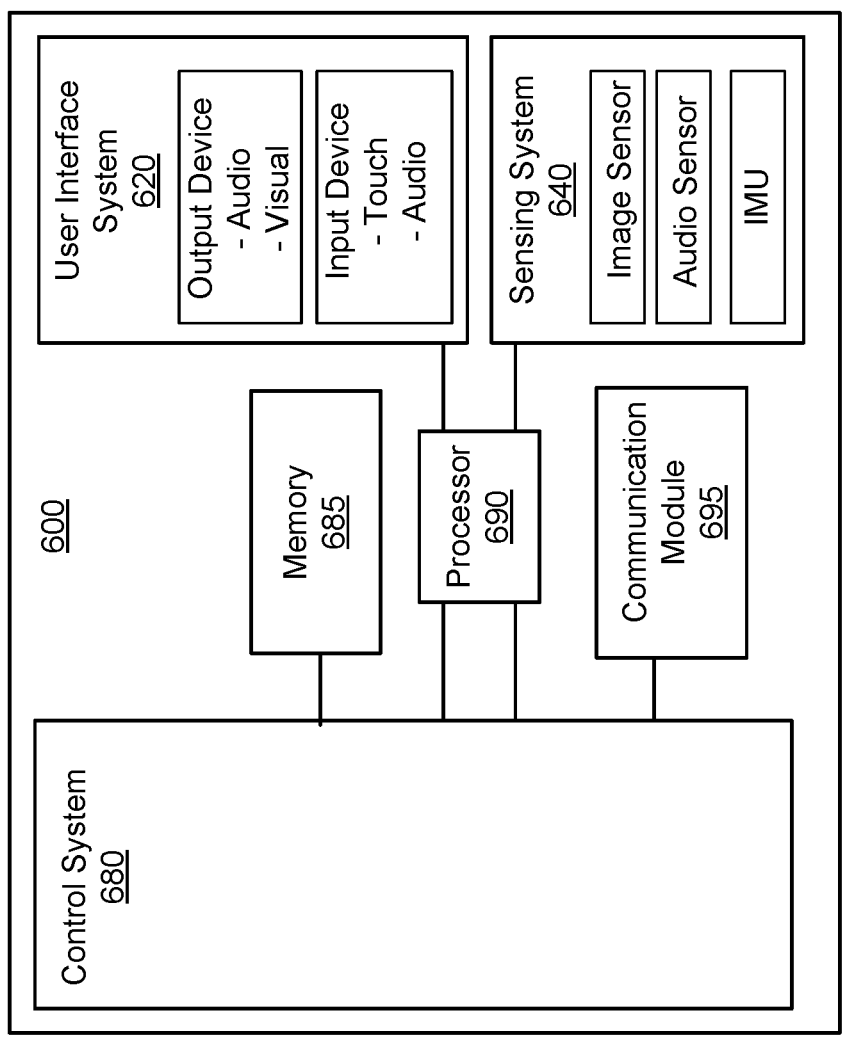
FIG. 6 is a block diagram of an exemplary system for generating an augmented, or mixed reality environment, in accordance with implementations described herein.

FIG. 6 is block diagram of computing device 600 that can generate an augmented reality, or mixed reality environment, and that can provide for user interaction with virtual objects presented in a camera view, or scene, of a physical environment, in accordance with implementations described herein. As shown in FIG. 6, the computing device 600 may include a user interface system 620 including at least one output device and at least one input device. The at least one output device may include, for example, a display for visual output, a speaker for audio output, and the like. The at least one input device may include, for example, a touch input device that can receive tactile user inputs, a microphone that can receive audible user inputs, and the like. The computing device 600 may also include a sensing system 640. The sensing system 640 may include, for example, a light sensor, an audio sensor, an image sensor/imaging device, or camera, a distance/proximity sensor, a positional sensor, and/or other sensors and/or different combination(s) of sensors. Some of the sensors included in the sensing system 640 may provide for positional detection and tracking of the computing device 600. Some of the sensors of the sensing system 640 may provide for the capture of images of the physical environment for display on a component of the user interface system 620. The computing device 600 may also include a control system 680. The control system 680 may include, for example, a power control device, audio and video control devices, an optical control device, and/or other such devices and/or different combination(s) of devices. The user interface system 620, and/or the sensing system 640 and/or the control system 680 may include more, or fewer, devices, depending on a particular implementation, and may have a different physical arrangement that shown. The computing device 600 may also include a processor 690 in communication with the user interface system 620, the sensing system 640 and the control system 680, a memory 685, and a communication module 695. The communication module 695 may provide for communication between the electronic device 600 and other, external devices, external data sources, databases, and the like, through a network.

Figure 7:
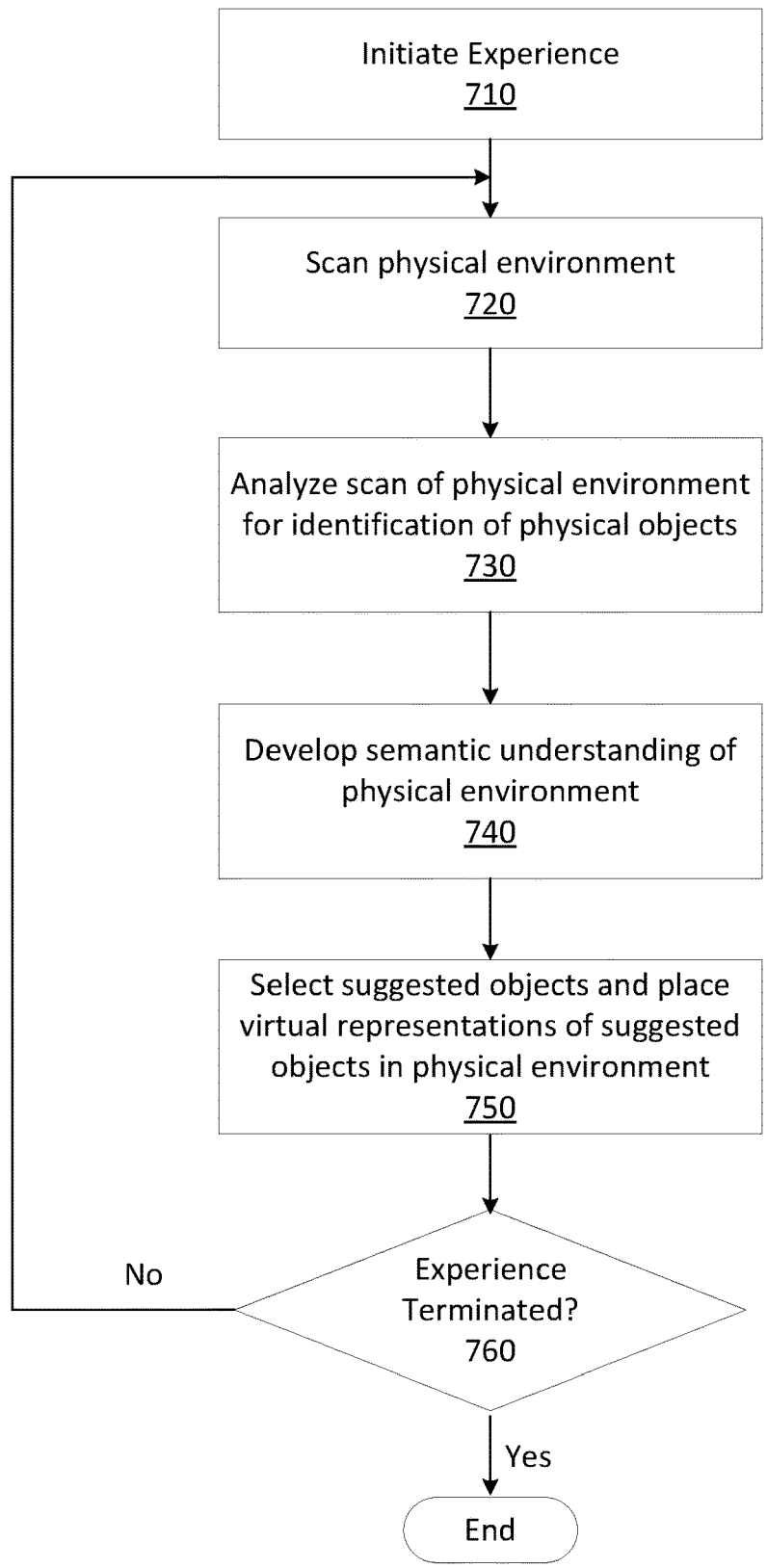
FIG. 7 is a flowchart of a method, in accordance with implementations described herein

A method 700 of generating an augmented reality, or mixed reality environment, and providing for user interaction with virtual objects presented in a camera view, or scene, of a physical environment, in accordance with implementations described herein, is shown in FIG. 7. A user may initiate an augmented reality, or mixed reality, or virtual reality experience, through, for example, an application executing on a computing device to display an augmented reality, or a mixed reality scene including a view of a physical environment (block 710). The augmented/mixed reality scene including the view of the physical environment may be, for example, a camera view of the physical environment captured by an imaging device of the computing device, and displayed on a display device of the computing device. Physical objects detected, for example, through a scan of the physical environment (block 720) may be analyzed for recognition/identification (block 730). Based on the physical objects identified in the physical environment, a semantic understanding of the physical environment may be developed (block 740). Based on the semantic understanding developed in the analysis of the physical objects detected in the physical environment, appropriate contextual objects may be selected for the physical environment, and virtual representations of the suggested objects may be placed in the AR/MR scene of the physical environment (block 750). The process may continue until the augmented reality/mixed reality experience has been terminated (block 760).

Figure 8:
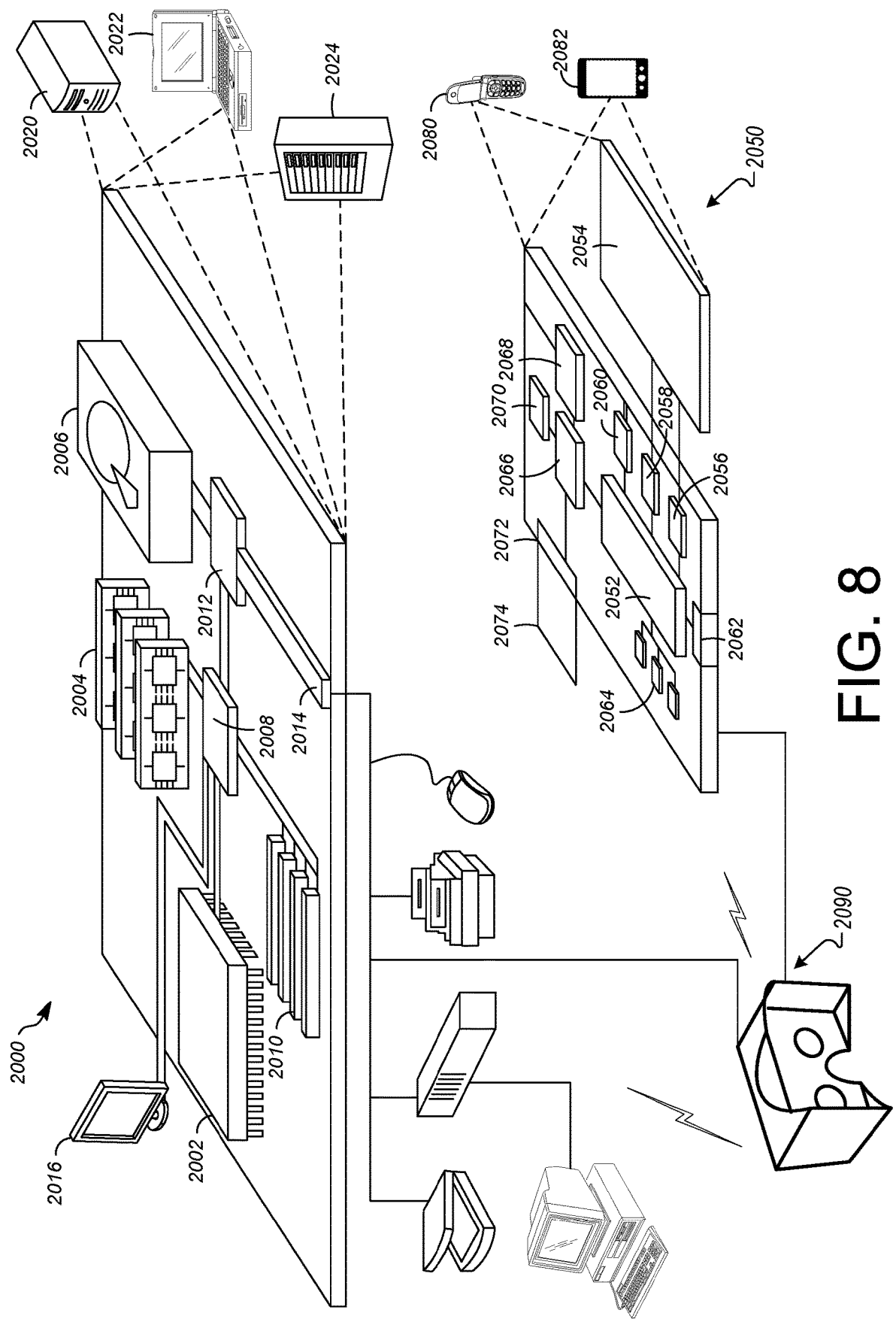
FIG. 8 shows an example of a computer device and a mobile computer device that can be used to implement the techniques described herein.

FIG. 8 shows an example of a generic computer device 2000 and a generic mobile computer device 2050, which may be used with the techniques described here. Computing device 2000 is intended to represent various forms of digital computers, such as laptops, desktops, tablets, workstations, personal digital assistants, televisions, servers, blade servers, mainframes, and other appropriate computing devices. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. The processor 2002 can be a semiconductor-based processor. The memory 2004 can be a semiconductor-based memory. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provide in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provide as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, WiFi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   directing a plurality of rays from a computing device toward a portion of a physical environment;
   detecting, by the computing device, at least one physical object in an image of the portion of the physical environment being displayed on a display of the computing device;
   detecting a plurality of keypoints based on the plurality of rays and the at least one physical object;
   projecting the plurality of keypoints onto a two-dimensional grid, the two-dimensional grid defining a plurality of tiles;
   detecting points at which the projected keypoints intersect tiles of the two-dimensional grid;
   identifying at least one unoccupied space in the portion of the image, including:
      marking the tiles, of the plurality of tiles, at which the keypoints intersect the two-dimensional grid, as occupied spaces;

marking three-dimensional bounds of at least one physical object based on the plurality of keypoints;

superimposing the two-dimensional grid on a plane corresponding to the at least one physical object as displayed on the display of the computing device;

marking tiles, of the plurality of tiles that do not include the displayed at least one physical object, as at least one unoccupied space;

identifying at least one suggested object for placement in the at least one unoccupied space of a displayed stream of images; and generating a mixed reality scene of the physical environment for display by overlaying at least one virtual representation corresponding to the at least one suggested object at a position in the mixed reality scene corresponding to the at least one unoccupied space identified in the displayed stream of images.

2. The computer-implemented method of claim 1, wherein detecting the at least one physical object includes:

comparing the detected at least one physical object to images stored in a database accessible to the computing device; and identifying the at least one physical object based on the comparison.

3. The computer-implemented method of claim 1, wherein the directing of the plurality of rays from the computing device toward the physical environment occurs while streaming the images of the portion of the physical environment;

the detecting of the plurality of keypoints is at points where the plurality of rays intersect with the at least one physical object; and each of the plurality of keypoints is defined by a three-dimensional coordinate.

4. The computer-implemented method of claim 1, further comprising determining a size of each of the unoccupied spaces based on at least one of a size, a contour, or an orientation of an identified physical object occupying one of the marked occupied spaces.

5. The computer-implemented method of claim 4, wherein identifying the at least one suggested object for placement in the at least one unoccupied space in the physical environment includes:

determining a context of the physical environment based on an identification of the detected at least one physical object; and identifying the at least one suggested object based on the determined context of the physical environment and the identified at least one unoccupied space.

6. The computer-implemented method of claim 5, wherein identifying the at least one suggested object includes:

identifying the at least one suggested object based on the determined size of the at least one unoccupied space relative to a position and an orientation of the identified at least one physical object.

7. The computer-implemented method of claim 5, wherein identifying the at least one suggested object includes:

identifying the at least one suggested object based on at least one of user preferences, user profile information, user browsing history, or an inventory of available items.

8. The computer-implemented method of claim 1, further comprising:

rearranging the placement of the at least one virtual representation corresponding to the at least one suggested object in the mixed reality scene of the physical environment in response to a user input.

9. The computer-implemented method of claim 1, wherein the at least one virtual representation corresponding to the at least one suggested object is manipulatable by a user so as to allow the user to select the at least one suggested object, or access additional information related to the at least one suggested object.

10. A system, comprising:

a computing device, including:
a display device;
a memory storing executable instructions; and
a processor configured to execute the instructions, to cause the computing device to:

direct a plurality of rays from the computing device toward a portion of a physical environment;

detect, by the computing device, at least one physical object in an image of the portion of the physical environment being displayed on the display device;

detect a plurality of keypoints based on the plurality of rays and the at least one physical object;

project the plurality of keypoints onto a two-dimensional grid, the two-dimensional grid defining a plurality of tiles;

detect points at which the projected keypoints intersect tiles of the two-dimensional grid;

identify at least one unoccupied space in the portion of the image, including:

mark the tiles, of the plurality of tiles, at which the keypoints intersect the two-dimensional grid, as occupied spaces;

mark three-dimensional bounds of at least one physical object based on the plurality of keypoints;

superimpose the two-dimensional grid on a plane corresponding to the at least one physical object as displayed on the display of the computing device; and mark tiles, of the plurality of tiles that do not include the displayed at least one physical object, as at least one unoccupied space;

identify at least one suggested object for placement in the at least one unoccupied space of a displayed stream of images; and generate a mixed reality scene of the physical environment for display by overlaying at least one virtual representation corresponding to the at least one suggested object at a position in the mixed reality scene corresponding to the at least one unoccupied space identified in the displayed stream of images.

11. The system of claim 10, wherein, in detecting the at least one physical object, the instructions cause the computing device to:

compare the detected at least one physical object to images stored in a database accessible to the computing device; and identify the at least one physical object based on the comparison.

12. The system of claim 10, wherein, the directing of the plurality of rays from the computing device toward the physical environment occurs while streaming the images of the portion of the physical environment are captured;

the detecting of the plurality of keypoints at points where the plurality of rays intersect with the at least one physical object; and each of the plurality of keypoints is defined by a three-dimensional coordinate.

13. The system of claim 10, wherein the instructions cause the computing device to:
   determine a size of each of the unoccupied spaces based on at least one of a size, a contour, or an orientation of an identified physical object occupying one of the marked occupied spaces.

14. The system of claim 13, wherein, in identifying at least one suggested object for placement in the at least one unoccupied space in the physical environment, the instructions cause the computing device to:
   determine a context of the physical environment based on an identification of the detected at least one physical object; and
   identify the at least one suggested object based on the determined context of the physical environment and the identified at least one unoccupied space.

15. The system of claim 14, wherein, in identifying the at least one suggested object, the instructions cause the computing device to:
   identify the at least one suggested object based on the determined size of the at least one unoccupied space relative to a position and an orientation of the identified at least one physical object.

16. The system of claim 14, wherein, in identifying the at least one suggested object, the instructions cause the computing device to:
   identify the at least one suggested object based on at least one of user preferences, user profile information, user browsing history, or an inventory of available items.

17. The system of claim 10, wherein the instructions cause the computing device to:
   rearrange the placement of the at least one virtual representation corresponding to the at least one suggested object in the mixed reality scene of the physical environment in response to a user input.

18. The system of claim 10, wherein the at least one virtual representation corresponding to the at least one suggested object is manipulatable by a user so as to allow the user to select the at least one suggested object, or access additional information related to the at least one suggested object.

19. The system of claim 10, wherein the computing device is a handheld computing device or a head mounted display device.

* * * * *